United States Patent [19]
Mayer

[11] 3,915,513
[45] Oct. 28, 1975

[54] ROLLER BEARINGS

[75] Inventor: Ernst Mayer, Erlangen, Germany

[73] Assignee: Industriewerk Schaeffler Ohg, Herzogenaurach, Germany

[22] Filed: Jan. 11, 1974

[21] Appl. No.: 432,548

[30] Foreign Application Priority Data
Jan. 27, 1973 Germany.............................. 2304015

[52] U.S. Cl................................................ 308/6 C
[51] Int. Cl.² .......................................... F16C 29/06
[58] Field of Search............ 308/6 R, 6 C, 184, 216; 226/198

[56] References Cited
UNITED STATES PATENTS
3,501,078   3/1970   Chang................................ 226/198
3,797,897   3/1974   Schaeffler........................... 308/6 C Primary Examiner—M. Henson Wood, Jr.
Assistant Examiner—Gene A. Church
Attorney, Agent, or Firm—Hammond & Littell

[57] ABSTRACT

Roller bearing for the longitudinally moveable mounting of elements comprising cylindrical rollers moving into and out of the space formed by two parallel races, one of said parallel races being provided with lateral flanges which guide the rollers on their plane end faces, the said lateral flanges on the race extending beyond the end of the race by a distance equal to at least one half of the roller diameter.

2 Claims, 4 Drawing Figures

Fig.1
Fig.2
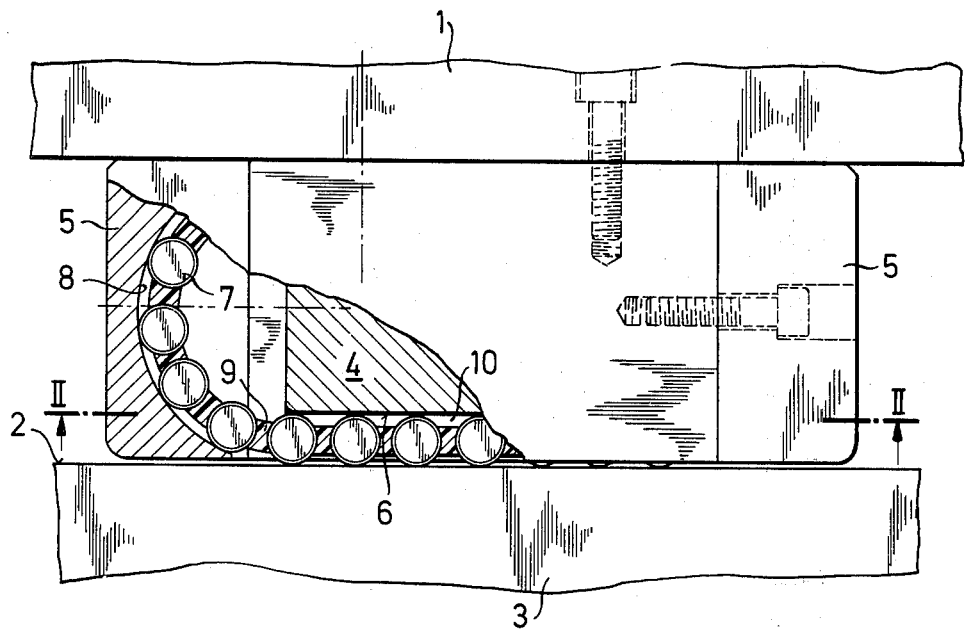
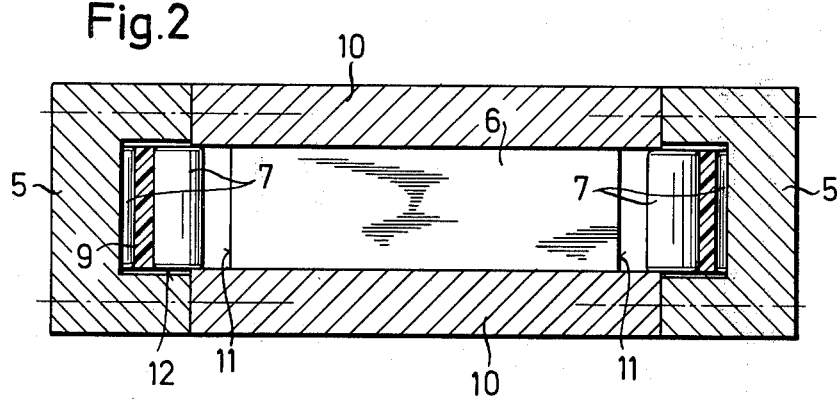

ROLLER BEARINGS

STATE OF THE ART

These types of rolling bearings are used primarily for the support of machine elements with long linear displacement distances and only a part of the rollers is in the load bearing section at any time with the other part of the rollers being unstressed. To ensure a smooth movement of the rolling bearing and a minimum of wear, it is necessary for the rollers to be aligned at least exactly at right angles to the direction of motion in the load bearing section when they are in contact with the opposite race. Moreover, care must be taken to avoid excessive sliding friction in the guidance of the rollers to ensure the desired smooth operation of the said rolling bearings.

To achieve these results, it is known to provide a race with lateral flanges to guide the rollers by their plane end faces. For the part of the rollers which are not under load, it is generally adequate for holding means or intermediate pieces to effect the guidance so that it is not necessary to provide guidance in this area to reduce costs or other reasons of manufacture. However, this construction has the disadvantage that the rollers are not always exactly aligned in a right angle to the direction of movement when entering the load bearing section which can lead to damage to the race or the rollers and may also impart jerky movements to the element being machined due to crossing of the rollers.

OBJECTS OF THE INVENTION

It is an object of the invention to provide a novel rolling bearing for longitudinal movements with a simple, economical means to ensure alignment of the rollers in the stressed area.

This and other objects and advantages of the invention will become obvious from the following detailed description The rolling bearing according to the invention for the longitudinally moveable mounting of elements comprises cylindrical rollers moving into and out of the space formed by two parallel races, one of said parallel races being provided with lateral flanges whiich guide the rollers on their plane end faces, the said lateral flanges on the race extending beyond the end of the race by a distance equal to at least one half of the roller diameter. This simple construction means that the rollers are already exactly aligned with their plane end faces with the lateral flanges while they are still unstressed.

In a modification of the bearing according to the invention, the race provided with the lateral flanges is part of a closed circulating track for the rollers preferably consisting of two parallel plane race sections and two semicylindrical sections connecting the two plane race sections with each other. This embodiment is particularly suitable for this type of bearing as the semicylindrical connecting sections can be simply produced and are cheaper since lateral flanges for the end faces of the rollers may be omitted.

In another embodiment of the invention, the rollers are received between the sections extending beyond the ends of the load bearing race with less play than there is between the lateral flanges of the load bearing section. This construction ensures that the rollers will be exactly guided in a right angle to the motion direction when entering the load bearing race area and also that the friction caused by the guidance of the lateral flanges is avoided in the load bearing race area in which the rollers can no longer change their position because of the effect of the load.

In a preferred embodiment of the invention, the areas of the lateral flanges extending beyond the load bearing race section are on at least one side under spring tension directed towards the plane end faces of the rollers. By this means, the rollers while still not under load are guided without any substantial play and are exactly aligned.

Referring now to the drawings:

FIG. 1 is a partial longitudinal section through a rolling bearing according to the invention and FIG. 2 is a cross-section of the embodiment of FIG. 1 taken along the line II—II.

Figure 3:
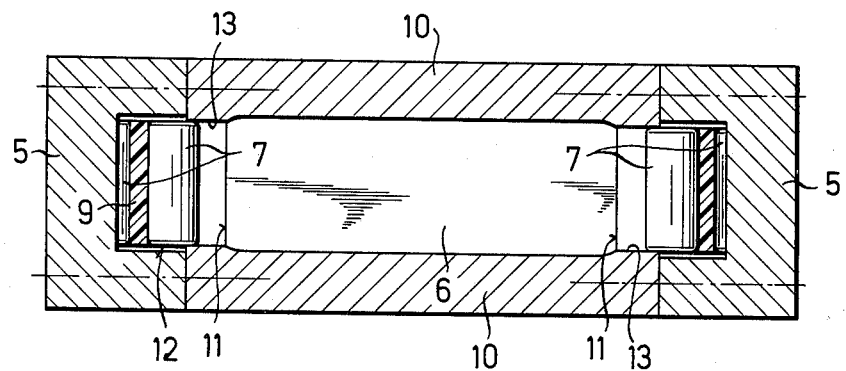
FIG. 3 is a cross-section similar to FIG. 2 of another embodiment of the invention and FIG. 4 is a partial cross-sectional view of another embodiment of the invention.

In the rolling bearing of FIGS. 1 and 2, element 1 is to be longitudinally moveable on element 3 which forms race 2. The bearing consists of bearing body 4 and end pieces 5 rigidly connected to body 4 by bolts. Bearing body 4 is provided with race 6 parallel to race 2 between which rollers 7 are under load and there is a return race section not shown between body 4 and element 1. These two race sections are connected by semi-cylindrical race sections 8 in each of the end pieces 5 to form a closed circulating track for the rollers.

The rollers 7 are retained by elastic intermediate elements 9 made of plastic for example which guide the rollers in race when the rollers are not under load. the load bearing section of race 6 is provided with lateral flanges 10 which extend beyond the ends 11 of load bearing race 6 by a distance equal to at least one half the roller diameter. As can be seen particularly from FIG. 2 the rollers 7 are guided by flanges 10 by their plane end faces 12 before they enter load bearing race 6.

In the embodiment of FIG. 3, the rollers 7 are received with their plane end faces 12 in area 13 of the lateral flanges which extend beyond the ends 11 of load bearing race 6 with less plan in area 13 than in the portion of the flanges 10 in the load bearing race 6 area.

Figure 4:
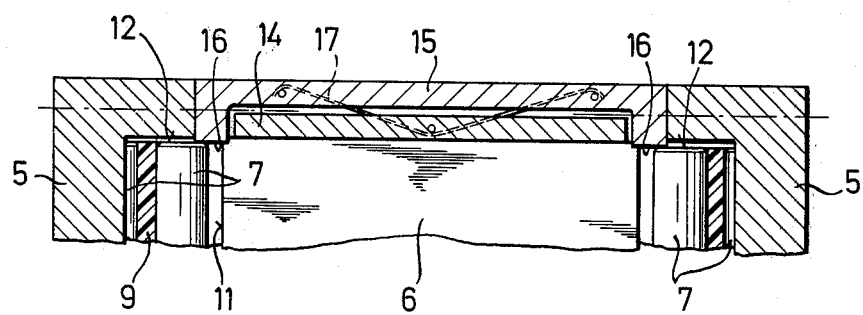

In the embodiment of FIG. 4, at least one of the lateral flanges 10 on the load bearing race 6 is designed so that the areas 13 of the flanges 10 extending beyond the ends 11 of the load bearing race 6 are under a spring tension directed towards the plane end face 12 of rollers 7. To effect this, a lateral border 14 on the load bearing race 6 which is rigidly connected to bearing body 4 is surrounded by a U-shaped guide bar 15 provided with arms 16 which act as guide flanges outside the load bearing race 6 and are pressed against the plane end faces 12 of rollers 7 by spring 17. These embodiments positively ensure that the rollers are exactly aligned in a right angle to the motion direction as they enter the load bearing race section.

Various modifications of the bearing according to the invention may be made without departing from the spirit or scope thereof and it is to be understood that the invention is to be limited only as defined in the appended claims.

I claim:

1. A rolling bearing for the longitudinally moveable mounting of elements comprising cylindrical rollers moving into and out of the space formed by two parallel races, one of said parallel races being provided with lateral flanges which guide the rollers on their plane end faces, the said lateral flanges on the race extending beyond the end of the race by a distance equal to at least one half of the roller diameter and means in the area of the lateral flanges just before the load bearing area to reduce the play of the rollers.

2. The bearing of claim 1 wherein the said means provides spring tension on at least one side directed towards the end faces of the rollers.

* * * * *